United States Patent [19]
Prettyjohns et al.

[11] Patent Number: 5,818,571
[45] Date of Patent: *Oct. 6, 1998

[54] APPARATUS WITH OFF-AXIS LIGHT PATH FOR CHARACTERIZING THE LUMINOUS INTENSITY OF LAMP

[75] Inventors: Keith N. Prettyjohns; Stephen L. Marcus, both of Tucson, Ariz.; Stephen F. Sagan, Sierra Madre, Calif.

[73] Assignee: Photometrics, Ltd., Tucson, Ariz.

[ * ] Notice: The term of this patent shall not extend beyond the expiration date of Pat. No. 5,729,336.

[21] Appl. No.: 834,628

[22] Filed: Apr. 14, 1997

Related U.S. Application Data

[63] Continuation-in-part of Ser. No. 643,574, May 6, 1996.
[51] Int. Cl.[6] .................................................. G01J 1/00
[52] U.S. Cl. ............................................................. 356/121
[58] Field of Search ..................................... 356/121–123

Primary Examiner—Frank G. Font
Assistant Examiner—Amanda Merlino
Attorney, Agent, or Firm—Herbert M. Shapiro

[57] ABSTRACT

Apparatus for determining the luminous intensity distribution of an automotive head light employs a curved mirror and a curved screen. A solid state camera is used to obtain a pattern of the head light output from the screen. The system requires a relatively small black box into which the head light output is directed. A beam splitter may be employed to relax the constraints on the positioning of the various components within the box. The setting of the test lamp to first and to second preset lateral angular positions at each of which a pattern is captured and the combining of the two patterns permits the use of components which are practical. The use of a linear CCD array permits economies to be obtained by rotating the test lamp or by scanning the linear array over a sequence of angular positions and by constructing a composite pattern from the patterns so generated. In an alternative embodiment, no beam splitter is used. Instead, the arrangement is an off axis arrangement which employs an aspheric lens at the input to the apparatus to reduce spot size at the screen and to improve the angular resolution measurement capability.

11 Claims, 8 Drawing Sheets

APPARATUS WITH OFF-AXIS LIGHT PATH FOR CHARACTERIZING THE LUMINOUS INTENSITY OF LAMP

REFERENCE TO RELATED APPLICATIONS

This application is a continuation-in-part of copending application Ser. No. 08/643,574 filed May 6, 1996 and assigned to the assignee of the present application.

FIELD OF THE INVENTION

This invention relates to luminous intensity measurement instruments and more particularly to such instruments which are useful for characterizing the luminous intensity of automotive lamps such as head lights, tail lights, signal lights and the like.

BACKGROUND OF THE INVENTION

Automotive head lights are required to meet certain luminous intensity requirements established by government agencies. Accordingly, each new head light design has to be characterized in order to establish that it meets government standards. That is to say, the luminous intensity of the head light has to be characterized prior to production and production runs have to be sampled to ensure compliance.

Standard practice in the automotive field is to employ a goniometer and to move the test lamp in a manner to ascertain the luminous intensity at, for example, each of twenty-six different angles. The system uses a single point photodetector which is placed at least sixty feet from the lamp (head light) being characterized in a totally dark room. The minimum distance requirement is imposed because the lamp is not a point source and the light from an area source at any given angle has to be measured at a very large distance in order to correctly ascertain the luminous intensity at that angular position.

This standard practice requires a dark room of considerable size (over sixty feet) and takes a considerable amount of time. As a consequence, it is impractical to characterize each head light in a production line and compromises are made which result in inaccuracies in measurements and in aiming head lights when installed.

New systems are being proposed to reduce the size of the dark room required and to speed up the time for characterizing a lamp. One such system employs a screen in front of a head light and uses a cooled charge coupled device (CCD) to take a picture of the screen. This system still requires a totally dark room, a distance of sixty feet, and a screen at least seventy feet wide although it is argued that if a lesser distance of fifteen to thirty feet were used, the loss in accuracy would be acceptable. A system of this type is described in Advances in Measurement Technology for Vehicle Lighting Systems by Ian Lewin, Automotive Design Advancements in Human Factors; Improving Driver's Comfort and Performance; SAE International Congress and Exposition; Detroit, Mich., Feb. 26–29, 1996.

BRIEF DESCRIPTION OF THE INVENTION

In accordance with the principles of the present invention the luminous intensity of a lamp (illustratively a head light) is ascertained using a black box measuring only about six feet by six feet by six feet. The system employs a spherical mirror which focuses the light from the head light onto a spherical screen. A CCD camera (preferably but not necessarily cooled) is used to take a picture of the screen to determine the luminous intensity pattern of the head light. The output of the CCD camera is stored and processed to provide the desired characterization of the head light. The system employs a beam splitter to permit the placement of the screen and the camera in convenient out of the way positions. The system not only permits the reduction in the size of the dark room but also reduces the amount of time for characterization of a head light to a level which may permit the characterization of head lights in a production line. The system provides for the movement of a test head light to at least two different preset lateral angular positions at each of which the characterization is determined.

DETAILED DESCRIPTION OF ILLUSTRATIVE EMBODIMENTS OF THIS INVENTION

Figure 1:
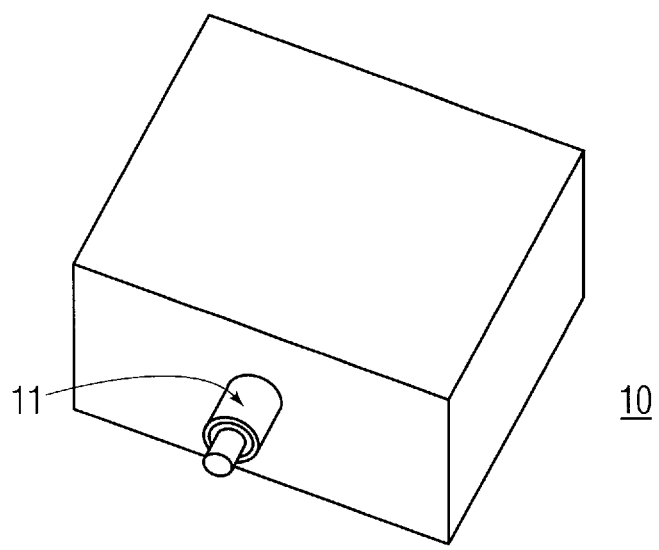
FIG. 1 is a schematic representation of a system for characterizing automobile head lights in accordance with the principles of this invention.

FIG. 1 shows a sealed box 10 in accordance with the principles of this invention. The box has a black interior surface and a port 11 into which light from a test head light 13 is directed. The box is about six feet deep and six feet on a side.

Figure 2:
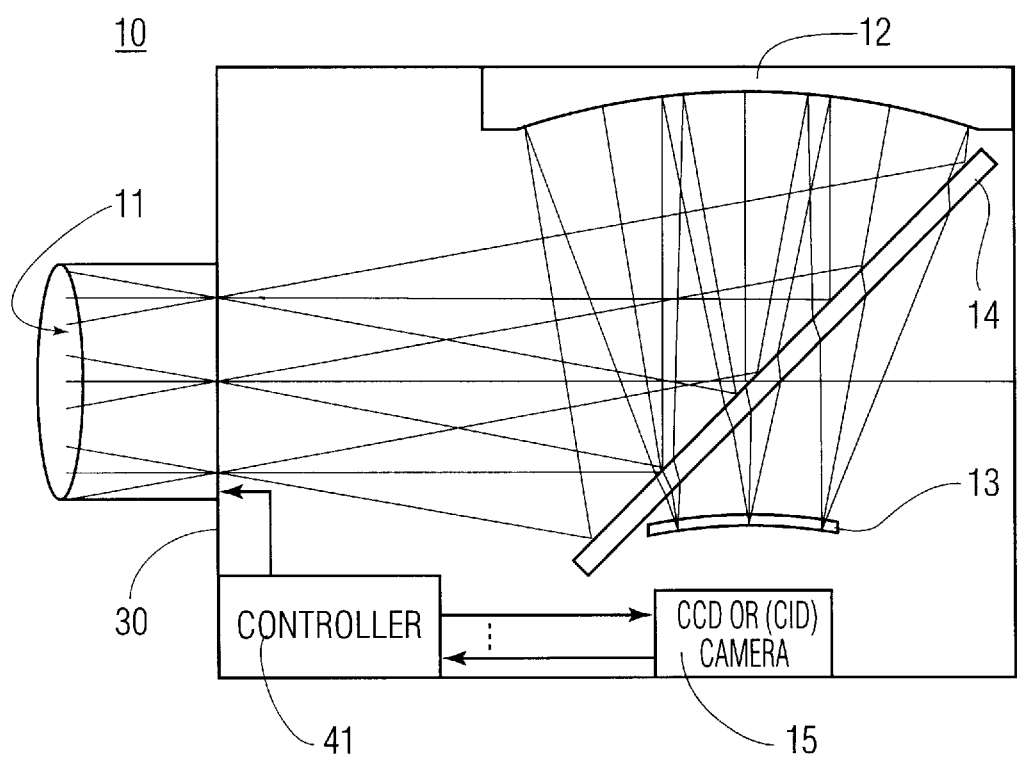
FIGS. 2 and 6 are schematic representations of alternate optical subsystems and electronic pattern capturing subsystems of the system of FIG. 1.

FIG. 2 shows, schematically, the components of the optical subsystem and the image capturing subsystem for the system of FIG. 1. Specifically, box 10 includes a spherical mirror 12, a scatter plate, or screen 13, and a beam splitter 14. Beam splitter 14 is used primarily to ease the constraints in the placement of the mirror 12 and the screen 13 with respect to the test lamp. The beam splitter is preferably a 50/50 beam splitter and is formed on a membrane as will be discussed in more detail hereinafter. A solid state camera such as a charge coupled device (CCD) camera 15 is located to capture the light pattern formed (focused) on screen 13 by mirror 12. This system maps the true luminous intensity of the lamp at different angular directions onto the screen at corresponding spatial locations.

Mirror 12 is 1.3 meters wide with a 1.0 meter radius of curvature, ideally, in order to achieve a measurement range of thirty degrees to either side of the center line of the input port in the arrangement of FIG. 1. Such a mirror would cost about $500,000.00 using state of the art fabrication technology and is therefor impractical for the systems contemplated herein. But, by enabling the test lamp to be preset in each of two different rotational positions and by capturing the luminous intensities at each position and by stitching together, by software, the two patterns so captured, a range of rotation of only fifteen degrees to either side of the center line of input port 13 suffices to provide the requisite measurement range and requires a mirror which is much smaller and of acceptable cost for such systems.

Figure 3:
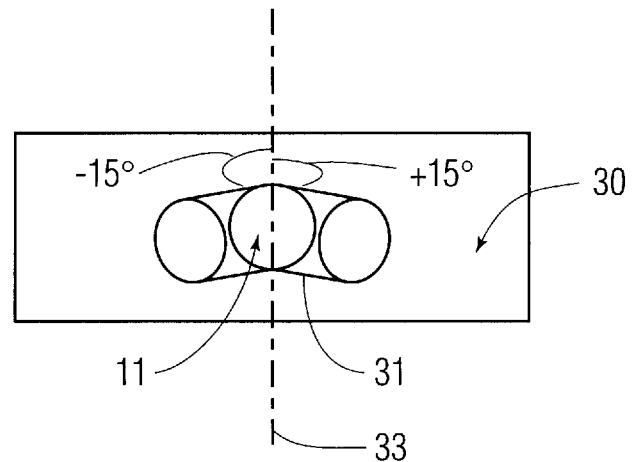
FIG. 3 is a schematic representation of a portion of a system of the type represented in FIG. 1.

FIG. 3 shows the front face 30 of box 10 of FIG. 1 along with a mount 31 which is settable at, at least, first and second angles of fifteen degrees to the right and to the left with respect to the center line 33 of the input port as viewed in the figure. With the test lamp settable in each of the two positions described in connection with FIG. 2, mirror 12 need only be about 0.85 meters by 0.6 meters (vertical).

Mirror 12, in the preferred embodiment, is an electroformed mirror or speculum and is adjustable to compensate for any unwanted movement during shipment. Beam splitter 14 comprises a "pellicle" which is a membrane stretched on a frame and having a semi-reflective film deposited on the membrane. Both the mirror and the pellicle are available commercially. Although a speculum may introduce some error in resolution due to the nature of electroforming, the error is within the acceptable range of one tenth of one degree resolution required of systems of this type.

Screen 13 is a diffusing screen of glass, or plastic coated with a diffusing coating having Lambertian properties. The screen preferably is spherical for systems which require high degrees of accuracy but could be a flat screen for less exacting lower cost systems. Relatively relaxed tolerances are permitted if the screen is curved.

The mirror is operative to focus all light from a test lamp, which emanates at a given angle, on a single spot on the screen (13). A head light, in order to meet U.S. government standards, is tested at twenty six different angles, as mentioned above, A solid state camera, such as a CCD camera is positioned in box 10 to capture a pattern of the luminous intensity distribution at each of the angle settings for a test head light, as discussed in connection with FIG. 2, under the control of a controller represented in FIG. 1 as block 41. That is to say, controller 41 is operative to set a test head light to a first angle, turn the head light on, and operate the camera to acquire the pattern focused on screen 13 by mirror 12 for processing. It is assumed that controller 41 may comprise any standard computer such as a personal computer (PC) which includes memory and is capable of storing and processing a sixteen bit signal representative of a pixel of the pattern acquired. To this end, the camera may comprise any (preferably cooled) commercially available CCD, Charge Injection Device (CID) or active pixel camera.

The operation of an illustrative CCD camera in such a system would be well understood by one skilled in the art and is described for head light image capture in the literature. Consequently, the operation of the CCD is not described in any further detail herein and is not necessary for an understanding of the present invention. The only exception is that two patterns are captured, in the preferred embodiment, and the camera subsystem needs to be able to combine the two patterns. The software to put the patterns together is discussed in connection with a flow diagram of the software hereinafter. Further, as is common of CCD systems, the camera has to be calibrated to compensate for variations in pixel sensitivity and offset characteristic of CCD cameras as is well understood in the art. In addition, the cameras must be calibrated against a known lamp standard (government accepted) in order to provide results tracable to a government approved standard for luminous intensity.

Figure 5:
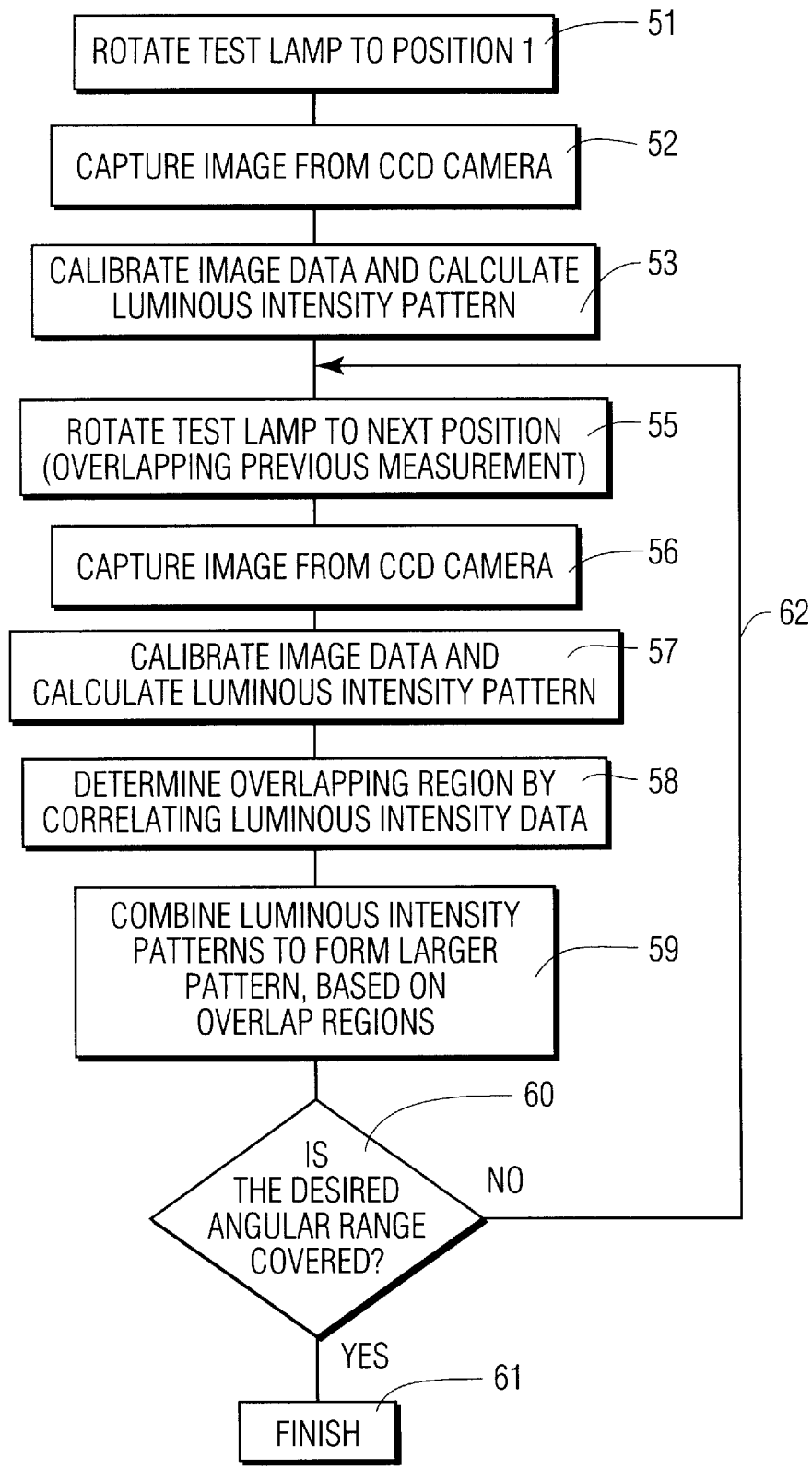
FIG. 5 is a flow diagram of the software for the pattern capturing subsystem of FIGS. 2 and 6.

The software for combining the two patterns captured by camera 15 at the two different lateral angular settings described in connection with FIG. 2 is discussed in connection with the flow diagram of FIG. 5. Specifically, Controller 41 operates to set the test lamp to a first angular setting as indicated by block 51 of FIG. 5. Next, the controller activates camera 15 to capture the pattern at that angular setting as indicated by block 52. The image data is calculated as indicated by block 53.

Controller 41 next rotates the test lamp to a second angular setting as indicated by block 55. the second setting is set to provide a pattern which overlaps the first pattern to ensure that no gaps occur in the final pattern and to ensure that the patterns are easily correlated when combined. The pattern is then captured as indicated by block 56 and the pattern is again calibrated and the luminous intensity pattern is calculated as indicated by block 57. The overlap of the two patterns is then determined by correlating the luminous intensities of the two patterns as indicated by block 58. The luminous intensity patterns are then combined to form the integrated pattern based upon the overlap regions as indicated by block 59. If the desired angular range is covered, the pattern capturing procedure is completed as indicated by blocks 60 and 61. If not, the procedure returns to block 55 as indicated by arrow 62.

Figure 4:
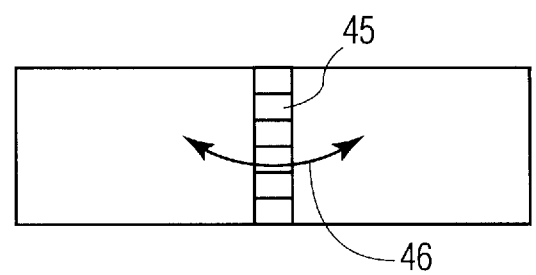
FIG. 4 is a schematic representation of an alternative pattern capturing subsystem for the system of FIGS. 2 and 6.

A linear CCD array could be used along with a means for scanning the array to sweep out an angle equal to the sweep of the two settings discussed in connection with FIG. 2. FIG. 4 illustrates a linear CCD array (or photodiode array) 45 along with a means for scanning the array as represented by the double-headed arrow 46. Such means for rotating (scanning) a linear array are well known in the literature and, accordingly, are not described further herein.

The use of a linear CCD array permits the array to be rotated to capture the pattern of the luminous intensity distribution or, instead, to rotate the test lamp. In the latter case, the means for rotating described in connection with FIG. 3 is operative to move the test lamp incrementally through a sequence of angles along a rotational path under the control of controller 41 and the controller is also operative to synchronize the camera to acquire a pattern at each angle and to combine the patterns to form a single pattern.

A similar software procedure is carried out for systems employing a linear CCD array where the test lamp is rotated to a sequence of angular positions and a pattern is captured at each of the positions. In this case, a test lamp is set in each of the angular positions discussed in connection with FIG. 3 and then rotated under the control of controller 41 to consecutive angular positions for each of which a pattern is captured. The integrated patterns are then combined to produce an integrated pattern for the lamp.

A rectangular CCD array also can be used in systems in accordance with the principles of this invention. Such an array would be clocked with the rotation of a test lamp so that the intensity pattern on any row in the array is synchronized with the rotation of the lamp such that a given row always receives the corresponding luminous intensity pattern. The array is operated in the familiar Time Delay Integration (TDI) mode. This provides an improved signal to noise ratio for the measurement and hence increases the measurement accuracy.

As an alternative to using a high performance camera to perform accurate measurements of the intensity distribution, a lower performance video camera can be employed to provide a real time view of the intensity pattern. This is beneficial for aligning a head lamp where adjustments can be made to the lamp position while the changes in the position of the intensity pattern are viewed in real time.

Figure 6:
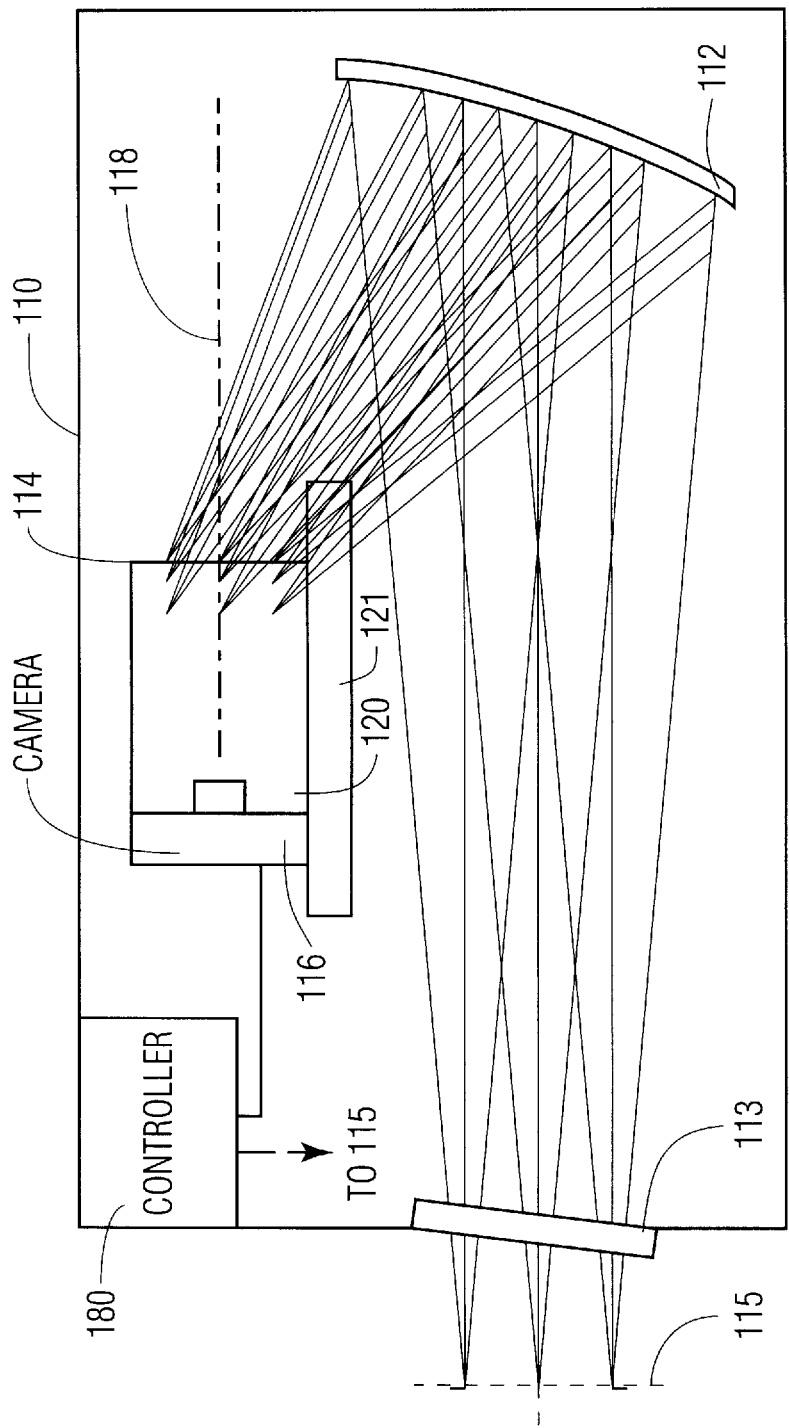

In an alternative embodiment, the beam splitter of FIG. 2 is omitted and the invention is implemented by an "off axis" design illustrated in FIG. 6. Specifically, FIG. 6 shows an arrangement where a box 110 includes a mirror 112, an aspheric lens 113, and a screen 114. The box again, has dimensions of about six feet on a side. Light rays emanating from a source represented by broken line 115 is directed into the input port of the box through lens 113 at mirror 112. Mirror 112 reflects the rays to screen 114. Camera 116, which includes a camera lens, captures the image on the screen. The arrangement is an "off axis" arrangement as can be seen with reference to the optical axis 118 of the camera.

Figure 7:
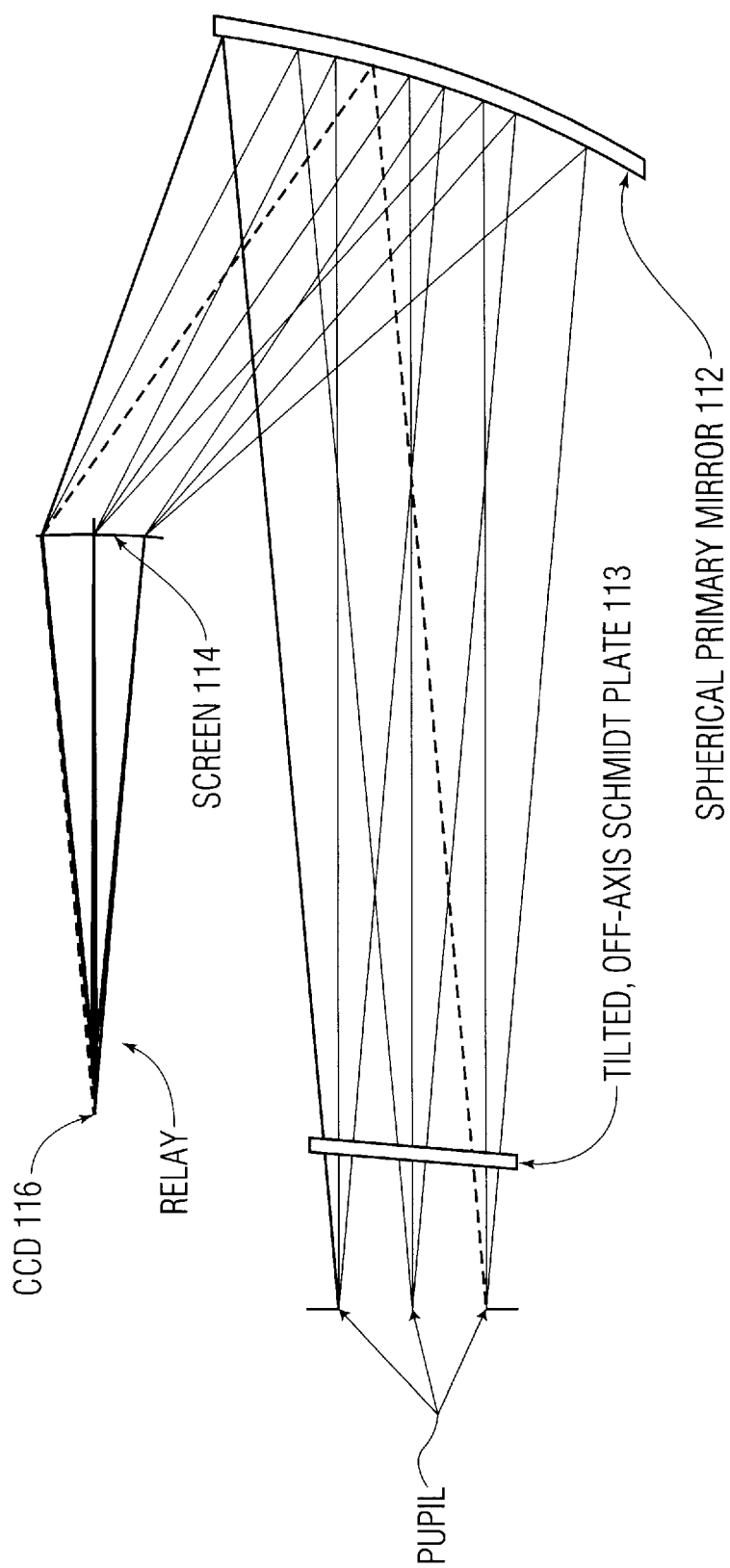
FIG. 7 is a schematic side view of the optical components and light rays of the subsystem of FIG. 6.

FIG. 7 shows a side view of the optical elements of the system of FIG. 6 along with the light rays. The test lamp is positioned to the left, as viewed in the figure, at the position labelled "pupil". The lens 113 at the input port is an anamorphic aspheric Schmidt plate which is tilted as shown. Mirror 112 is a spherical primary reflecting light to screen 114. The position of the CCD camera is also shown on the top left as viewed.

The degree of "off axis" orientation is important. If the orientation is insufficient, ghost images are reflected back from mirror 112 to lens 113 where they are reflected back to the screen and captured by the camera. The anamorphic aspheric Schmidt plate 113 is chosen to reduce spot size at the screen and hence to improve angular resolution measurement capability.

The camera, preferably a sixteen bit, cooled CCD camera, measures all light emitted from the light source at a given angle across all angles that are imaged on the screen (plus or minus 17 degrees horizontal and plus and minus 5 degrees vertical). By sliding the screen/camera towards and away from the primary mirror along the optical axis 118, to one of three designated positions, it is possible to create an image of the intensity distribution at infinity (true luminous intensity) at sixty feet (USDA regulations) or at 25 meters (European regulations).

Because the alternative light source for the design of FIG. 6 is an automobile headlight, the light source is about eight inches on a side and thus is not a point source. Consequently, light rays emanating at a given angle but from different sections of the source strike the screen at different angles and it is thus necessary to obtain a screen which produces a Lambertian distribution for the light scattered from the screen regardless of the angle of incidence.

A screen with the desired properties has an acrylic, spherical substrate with a coating commonly used for projection TV screens. Also, the screen has a thickness such that the internally reflected light and optical crosstalk within the screen does not restrict the measurement dynamic range. A screen thickness of one millimeter or less with an antireflective coating produces the desired properties.

Figure 8:
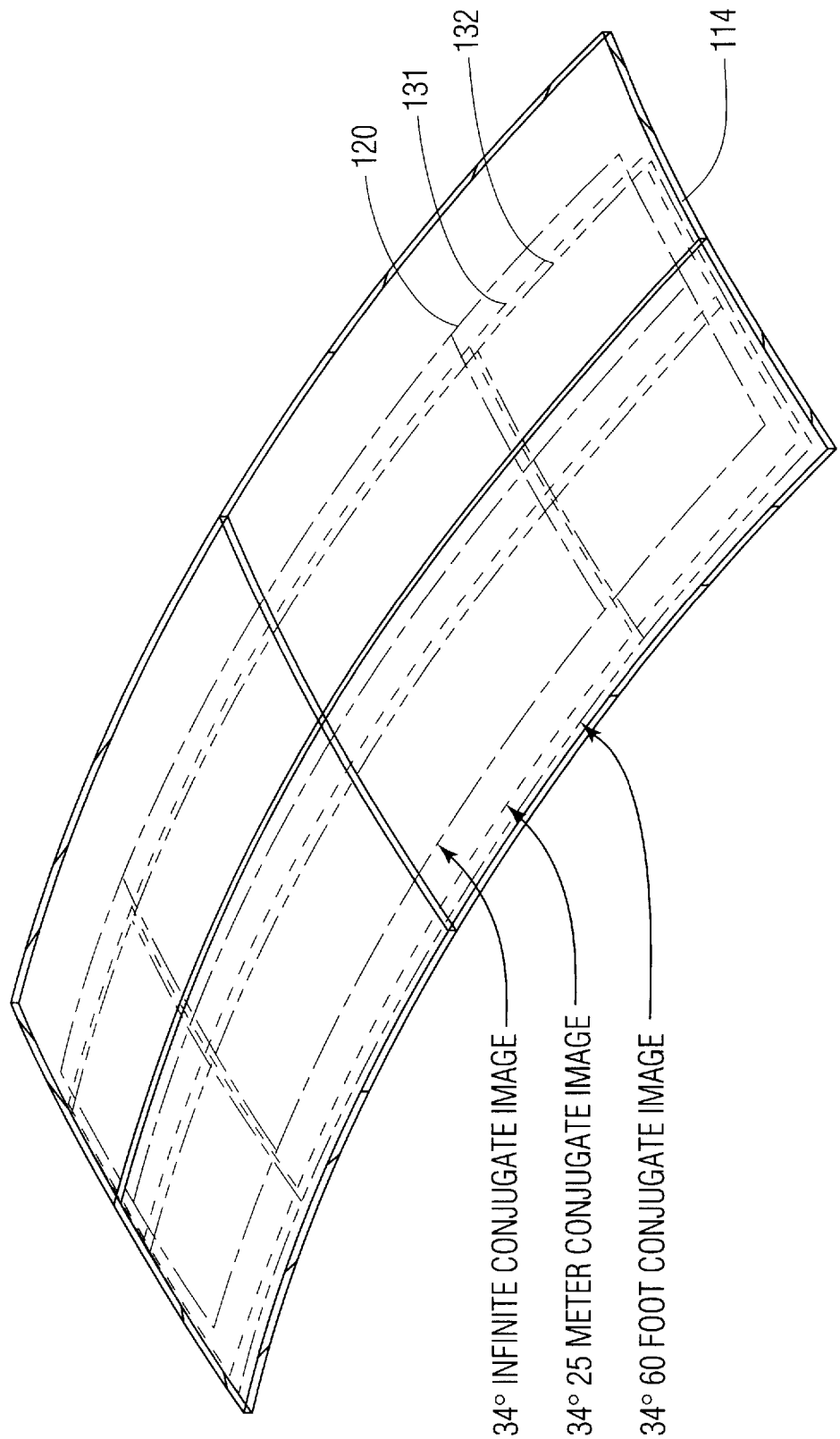
FIG. 8 is an isometric view of the screen of the subsystem of FIG. 6.

FIG. 8 is an isometric view of the screen. The screen has typical dimensions of 20,400 inch by 7.000 inch with an outer surface curvature of thirty four inches and a shell thickness of 0.10 inch and is made of acrylic material.

There are three different but overlapping areas of the screen represented by curved rectangles 130, 131, and 132 in FIG. 8. The rectangles correspond to the images of the luminous intensity fields at the infinite conjugate, at the twenty five meter, and at the sixty foot settings for the camera/screen position.

Figure 9A:
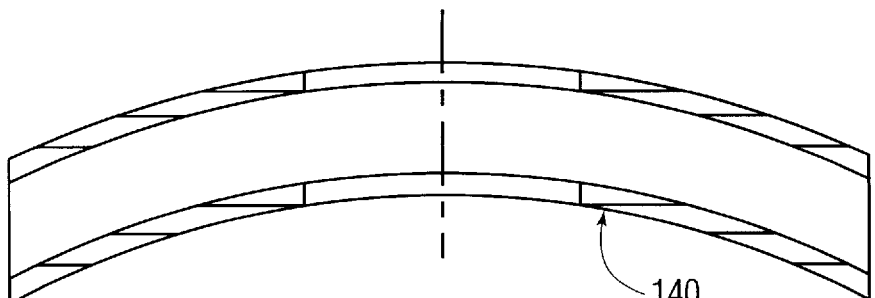
FIGS. 9A, 9B, and 9C are top, front, and side views of the mirror of the subsystem of FIG. 6.
Figure 9B:
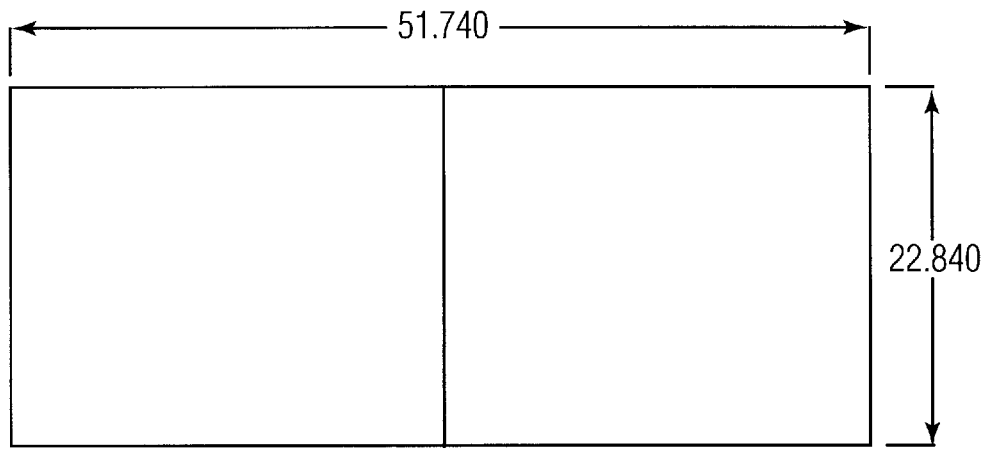
Figure 9C:
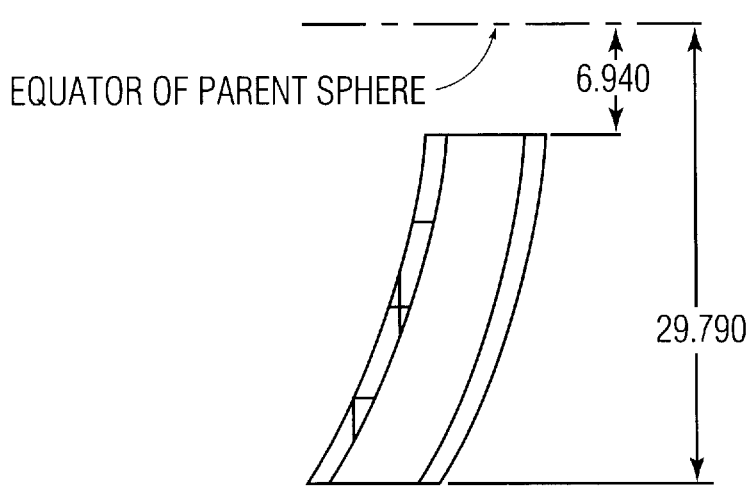

FIGS. 9A, 9B, and 9C show front, top, and right side views, respectively, of the primary mirror (substrate) 112 of FIG. 6. The radious of curvature of the frony surface 140 of the mirror is sixty inches and has dimensions of 51.740 and 22.840 and a thickness of one inch as indicated in the figures. The mirror is a section of a (parent) sphere, the equator of ehich is 6.940 inch from the top of the mirror and 29.780 inch from the bottom as shown in the right side view of FIG. 9c. Such a mirror can be manufactured commercially at reasonable cost.

Figure 10:
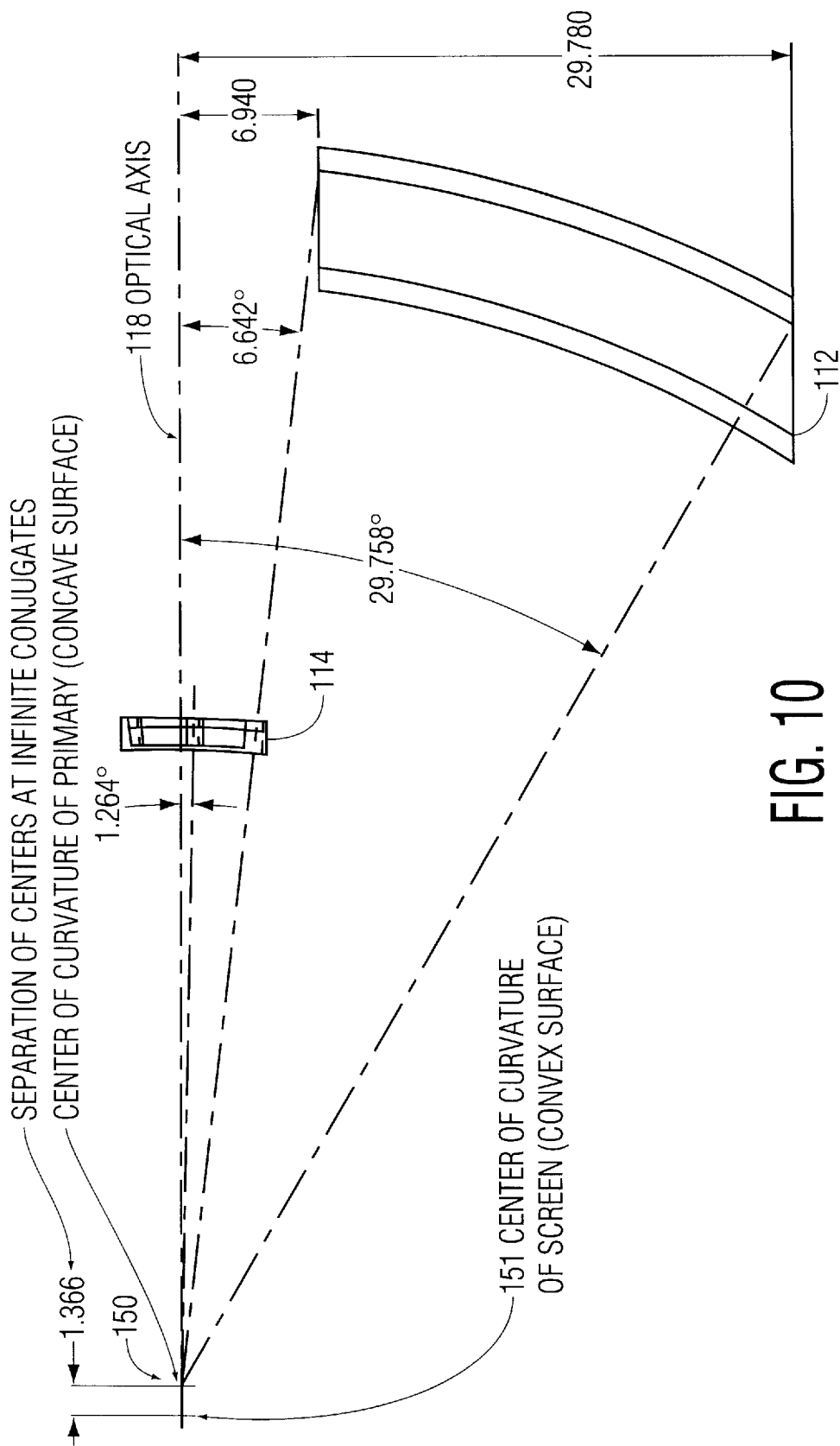
FIG. 10 is a schematic layout of the relative orientations of the optical components of the subsystem of FIG. 6.

The relative orientation of the screen 114 and mirror 112 is shown in FIG. 10. The figure shows the optical axis 118 of the camera with the screen center 1.264 degrees off axis and the mirror (top) 6.642 degrees off axis as indicated in the figure. The center of curvature of the mirror is designated 150 and the center of curvature of the screen is designated 151, the separation therebetween at the infinite conjugate position is 1.366 inch as indicated in the figure. The rotation angles relative to the optic axis 118 are measured about the centers of each surface. The separation between centers of curvature (center of primary to the right of center of the screen) as viewed in FIG. 10 are:

34.700 mm (1.366 inch)—for the infinite conjugate position 14.600 mm (0.575 inch)—for 25 meter position 6.800 mm (0.268 inch)—for the 60 foot position The camera is in a sealed box 120 and is movable on a slide represented by block 121 (FIG. 6) along an axis parallel; to the optical axis 118 of the apparatus to first, second, and third positions at which the intensity pattern seen on the screen corresponds to the true luminous intensity (at infinity), the intensities (measured by goniometer) at twenty five meters and at sixty feet respectively. The US government specifies measurements to be made at a distance of sixty feet. European regulations require measurements to be made at a distance of 25 meters. The finite conjugate position provides true luminous intensity measurements (measured at infinity).

The angular positions recorded on the screen are calibarated by rotating a laser (collimated) source at the entrance pupil through known angles and recording the position of the resulting spot produced on the screen using the camera. The software then records the position of the spot corresponding to the angular position of the laser. The software can then extract the angular positions from all future intensity measurements.

The system is calibrated in luminous intensity by measuring a light source with a known luminous intensity distribution (which is traceable to a fixed standard such as the US government NIST standard). The values for luminous intensity measured by the camera are then corrected in software by multiplicatioon of a correction factor, such that the result correctly equals the known luminous intensity of the source.

The activation and position of the light source and the operation and position of the camera with respect to the screen are under the control of a controller 180 of FIG. 6. Lens 113 serves the additional purpose of sealing the box (110). It is important to maintain the interior of the box free of dust and to provide baffles to absorb stray light. Such baffles are arranged, for example, bnetween lens 113 and mirror 112, providing a series of rectangular apertures for light directed at mirror 112. It is also necessary to provide specular black absorbers around mirror 112 mounted on the interior face of the box.

The software described in connection with FIG. 5 also is useful with the embodiment of FIGS. 6 through 10. The angular settings of a test lamp described in connection with FIG. 3 and the movement of a linear CCD described in connection with FIG. 4 are also useful with the embodiment of FIGS. 6 through 10.

The apparatus of the present invention can be used to adjust the aim of a headlight by measuring the luminous intensity pattern collected from the camera and by adjusting the headlight direction until luminous intensity values measured at preset positions fall within prescribed limits.

What is claimed is:

1. Apparatus for characterizing the luminous intensity of a lamp, said apparatus comprising a black box with a port for the positioning of a lamp the light output of which is to be characterized, said apparatus including a curved mirror positioned in said box to receive the light output from a lamp at said port, said apparatus also including a screen positioned in said box in a position to receive the light output focused by said mirror for providing a luminous intensity pattern of said light output and a solid state camera positioned to acquire said pattern from said screen, said apparatus including a window at said port, said lamp and said mirror being arranged to direct light at an angle to the optic axis of said apparatus.

2. Apparatus as in claim 1 wherein said window comprises an anamorphic aspheric Schmidt plate.

3. Apparatus as in claim 2 wherein said camera is a CCD camera.

4. Apparatus as in claim 2 wherein said camera is a cooled CCD camera.

5. Apparatus as in claim 2 wherein said camera is a CID camera.

6. Apparatus as in claim 2 wherein each of said screen and said mirror is spherical.

7. Apparatus as in claim 6 also including means for rotating said lamp to each of at least two different angular positions.

8. Apparatus as in claim 3 also including means for rotating said lamp to a prescribed sequence of positions wherein said CCD camera is a linear CCD array camera, said apparatus also including means for synchronizing said means for rotating said camera to capture a pattern from said screen and to read out said pattern from said camera at each of said sequence of prescribed positions.

9. Apparatus as in claim 6 wherein said camera comprises a linear CCD array, said apparatus also including means for scanning said array and means for synchronizing said means for scanning and said camera to capture a pattern from said screen and to read out said pattern from said camera at each of said sequence of prescribed positions.

10. Apparatus as in claim 7 wherein said camera comprises a linear CCD array, said apparatus also including means for rotating said test lamp to a sequence of angular positions, and means for synchronizing said means for rotating and said camera to capture a pattern from said screen at each of said sequence of rotational positions.

11. Apparatus as in claim 1 also including means for moving said screen and said solid state camera to anyone of at least first, second, and third positions for obtaining a luminous intensity pattern corresponding to that obtained at infinity, at 25 meters and at 60 feet, respectively.

* * * * *